(12) United States Patent
Hollub (10) Patent No.: US 6,302,167 B1
(45) Date of Patent: Oct. 16, 2001

(54) APPARATUS AND METHOD FOR REMOVING AND REPLACING VEHICULAR HYDRAULIC FLUID WHILE FLUSHING THE HYDRAULIC SYSTEM

(76) Inventor: Peter C. Hollub, 1161 Pacific Cove La., Huntington Beach, CA (US) 92648

( * ) Notice: Subject to any disclaimer, the term of this patent is extended or adjusted under 35 U.S.C. 154(b) by 0 days.

(21) Appl. No.: 09/482,239

(22) Filed: Jan. 13, 2000

(51) Int. Cl.⁷ .................................................. B65B 1/04
(52) U.S. Cl. .................................. 141/98; 141/65; 184/1.5
(58) Field of Search ..................... 141/65, 98, 311 A, 141/86; 184/1.5

(56) References Cited

U.S. PATENT DOCUMENTS

| | | |
|---|---|---|
| Re. 36,650 * | 4/2000 | Viken ..................................... 184/1.5 |
| 4,193,487 | 3/1980 | Takeuchi . |
| 4,772,402 | 9/1988 | Love . |
| 5,021,152 | 6/1991 | Filowitz . |
| 5,028,144 | 7/1991 | Klein . |
| 5,060,703 | 10/1991 | Koerner . |
| 5,318,700 | 6/1994 | Dixon . |
| 5,410,881 | 5/1995 | Ellis . |
| 5,415,247 * | 5/1995 | Knorr ..................................... 184/1.5 |
| 5,429,753 | 7/1995 | Hilgren . |
| 5,447,184 | 9/1995 | Betancourt . |
| 5,472,064 | 12/1995 | Viken . |
| 5,497,864 | 3/1996 | Oien . |
| 5,569,389 | 10/1996 | Hilgren . |
| 5,593,596 | 1/1997 | Brahen . |
| 5,597,601 | 1/1997 | Griffin . |
| 5,641,003 * | 6/1997 | Rey et al. .............................. 184/1.5 |
| 5,787,372 * | 7/1998 | Edwards et al. ...................... 184/1.5 |
| 6,206,055 | 3/2001 | Hollub et al. . |

* cited by examiner

Primary Examiner—Steven O. Douglas
(74) Attorney, Agent, or Firm—Blakely, Sokoloff, Taylor & Zafman LLP (57) ABSTRACT

An apparatus and method for removing and flushing hydraulic fluid and contaminants from a vehicle's or other equipment's hydraulic system, and refilling the hydraulic system with new fluid. The apparatus has a vacuum pump to remove old hydraulic fluid from the master cylinder (reservoir) and a manifold and hose system to allow all bleeder valves and the ABS valves to be vacuumed at the same time through a hose system to a waste fluid container in the apparatus, a reversing vacuum pump to transfer waste fluid from the waste fluid container in the apparatus to an exterior storage tank, a reversing fill pump to pump new fluid from the new fluid container (in the apparatus) to the universal master cylinder adapter which connects the fill hose to the master cylinder, a combination of surging fill flow and surging vacuum out flow to produce a safe rapid removal of old fluid and refill of new fluid, a cross venting system to keep moisture and other contaminants from entering the new fluid container and to keep either the new fluid or the waste fluid container from venting fumes to the atmosphere. The apparatus also has sensors to detect and correct pressures and vacuum for safety and pump life. The apparatus also has a sensor to detect fluid levels in the waste fluid container in the apparatus, and a sensor to detect the availability of new fluid available for the service. The apparatus also provides a monitored leak containment area in the bottom of the apparatus to contain any leaks and advise the service provider of a leaking condition. The vacuum pump and vacuum wand can be used to clean out the containment area.

42 Claims, 8 Drawing Sheets

FIG. 1

Old technique(s) for brake bleeding

Steps to vacuum waste brake fluid from, and flush and refill a vehicle's hydraulic brake fluid.

a. remove the hydraulic fluid system reservoir cap or cover;

b. activate a vacuum pump and using a controllable vacuum wand vacuum out said hydraulic fluid reservoir through the vacuum hose to a waste fluid tank;

c. select and attach an appropriate adapter to said master cylinder;

d. attach a fill hose, with a quick disconnect, which is connected to a new fluid container containing new hydraulic fluid;

e. activate a fill pump which fills the master cylinder with new brake fluid, f. attach bleeder valve hoses to all bleeder valves of the vehicle's or other equipment's hydraulic system;

g. activate the vacuum pump and vacuum waste brake fluid from the bleeder valves and also vacuum waste fluid from the ABS valves;

h. at the same time as g. activate the pressure/fill pump and pump new brake fluid into the hydraulic system;

i. turn off the vehicles bleeder valves when the fluid exiting the vehicle's hydraulic brake system through the bleeder hoses is clear.

j. stop the vacuum pump and then the pressure/fill pump;

k. reverse the fill pump for 3 to 5 seconds to remove any pressure in the master cylinder;

l. remove the master cylinder adapter;

m. replace the vehicle's or other equipment's master cylinder cover.

n. check the brake pedal for firmness.

FIG. 11

APPARATUS AND METHOD FOR REMOVING AND REPLACING VEHICULAR HYDRAULIC FLUID WHILE FLUSHING THE HYDRAULIC SYSTEM

BACKGROUND

The present invention relates to a superior apparatus and method for removing and replacing vehicular hydraulic fluid. In particular the present invention relates to an apparatus for removing and replacing (changing) the hydraulic brake fluid used in the brake system of an automobile, truck, recreational or other vehicle. In conjunction with replacing (changing) the hydraulic fluid the hydraulic system is flushed of contaminants such as air, water, degraded hydraulic fluid and particulates. Significantly, the present system and method can be carried out as a substantially closed system.

Modern motor vehicles have internally-expanding, hydraulically operated brakes. Hydraulic actuation is based on the natural law principle that a pressure exerted upon a liquid is transmitted uniformly in all directions. An internal expanding brake system typically comprises a main or master cylinder with a reserve fluid tank, wheel cylinders and connecting brake lines or pipes. Application of the brakes by depressing the brake pedal causes a piston in the master cylinder to move which in turn displaces a hydraulic brake fluid stored in the master cylinder and causes the brake fluid to move through the brake lines. A pump can be used to increase braking capacity. The displaced brake fluid transmits a pressure through the fluid filled brake lines to the wheel cylinders that actuate the brake shoe or pad. As a result brake shoes or pads are thrust against a brake drum to stop the vehicle's wheels. Brakes pads, shoes or discs apply a force to particular components, such as the brake drums or rotors, which rotate with the wheels. As much as 2,000 pounds PSI of hydraulic pressure may be exerted by the brakes on each of the four wheels to stop the vehicle. Brake fluid also acts as a lubricant for pistons, cylinders, seals and valves within the brake system.

The pressure in a hydraulic system can be generated by a hydraulic pump, such as by a geared pump, a piston pump or a vane pump, which delivers a fluid, such as oil, through a delivery pipe to a control valve.

Brake fluid is the liquid used in automotive hydraulic brake systems. Different brake systems can use different types of brake fluid. Desirable brake fluid characteristics include a high boiling temperature, a low freezing temperature, the ability to absorb moisture and a low tendency to bubble. If the brake fluid becomes contaminated, piston seals, hoses and other parts within the brake system may have to be replaced to prevent malfunction of the braking system. Brake fluid is corrosive to paint and its spillage can therefore affect a vehicle's finish. Additionally, inhalation of brake fluid fumes and contact with the skin can present a health hazard. It also is a very innocuous yet dangerous environmental hazard as it rapidly is absorbed into water stores without detection.

Common vehicular brake fluids have ratings such as DOT (Department of Transportation) 3,4 or 5. DOT 3 brake fluid is generally used for normal city driving, DOT 4 for mountain, trailer towing or frequent hard braking use and silicone based DOT 5 brake fluid for performance or racing vehicles. Essentially, the higher the DOT rating the higher the boiling point of the brake fluid. The higher the boiling point of the brake fluid, the more hygroscopic or water absorbing the brake fluid tends to be. A brake fluid with a 3% water content can have a boiling temperature 25% lower than a water free brake fluid has.

Additionally, at low temperatures the water absorbed by the brake fluid can form ice crystals which impedes free flow of the brake fluid. Thus, the presence of water causes both a lower boiling point, and ice to form at low temperature both of which can reduce brake function.

Additionally, oxygen in the air can oxidize the brake fluid, which also reduces its boiling point. Even without extreme temperatures the water absorbed by the brake fluid can cause brake components to rust and fail. Additionally the additive packages used in brake fluids to reduce oxidation, foaming and corrosion are denigrated by the presence of moisture.

Generally, automotive brake fluid should be replaced and the brake system flushed of contaminants when the moisture level in the brake fluid had reached about 3%, when contamination is present, or when the hydraulic fluid's inhibitor package has deteriorated.

Most brake fluids are clear, volatile, water-soluble liquids comprised of a mixture of several alcohols such as glycols. Silicone based (DOT 5) brake fluids are also known. Due to its volatile nature and easily absorbed constituents, inhalation of and/or contact with brake fluid is not advised and can be hazardous to one's health. It is known that alcohol can degrade rubber seals and hoses. Additionally, through use brake fluid can become discolored due to contamination from dirt and disintegrating rubber seals. As stated, brake fluid is hygroscopic and absorbs moisture from the air, which lowers its boiling point, and provides an opportunity for corrosion to start inside the brake system. A lower brake fluid boiling point can result in the brake fluid boiling during, i.e. a long downhill stretch of intermittent braking. If the brake fluid boils the bubbles created reduce brake effectiveness and causes brake fade ("soft brakes") because the gas formed absorbs foot pressure instead of transmitting it through the brake lines.

Particulate matter such as airborne dust and rubber seal fragments can also collect within the fluid filled brake lines preventing proper sealing of valves within the braking system.

To remove water and contaminants the brake fluid is periodically removed and replaced with new brake fluid, thereby restoring the brake fluid's heat capacity, corrosion resistance and braking efficiency. The drained brake fluid is not reused because of its contamination and also once exposed to the atmosphere, even if only for a brief period, significant amounts of water, air (with the oxidizing oxygen) and contaminants such as dust can be absorbed by the brake fluid. Even new brake fluid exposed to ambient air can absorb moisture resulting in an immediate loss of the brake fluid's effectiveness. As evidence, brake fluid manufacturers recommend proper disposal of the unused portion of brake fluid supplied in small cans to the consumer industry. This is due to the high probability that the fluid remaining in the can was contaminated during the time the can was open and the possibility that the can would not be properly sealed to prevent future contamination prior to it being used again.

Brake fluid can be tested to determine its viability, as by determining its water content by the method and apparatus disclosed by U.S. Pat. No. 5,028,144, which patent is incorporated herein in its entirety. The '144 patent does not disclose an apparatus for removing or replacing brake fluid.

Thus hydraulic fluid, which is central to operation of the brake system, is periodically replaced due to fluid deterioration and contamination. Many hydraulic fluids have volatile and/or toxic components, which can hinder removal and replacement of the fluid.

Typically, the entire hydraulic fluid is drained from the brake system and replaced with new fluid, the whole operation being carried out in an open-air environment whereby the fluid is exposed to the atmosphere as the brake system is being drained and new fluid is added. Unfortunately this known method can release pollutants into the air and exposes the operator to potentially harmful fluids and vapors. Additionally, no attempt is made to recycle or reuse any of the hydraulic fluid resulting in economic waste and fluid disposal problems. Furthermore, some states have imposed a fee for the collection and disposal of used brake fluid from automotive service centers and the brake fluid is typically collected into open containers.

Typically brake fluid is changed per the warranty requirements of the manufacturer or as recommended by automotive experts by examining the color of the brake fluid or by replacement after a predetermined period (i.e., after 18 to 24 months or after 30,000 miles of vehicle usage).

If desired, a brake fluid moisture water content, or corrosion test can be done quickly utilizing currently available technology. Test strips available from Wagner or Phoenix Systems can be inserted into a vehicle's brake fluid to determine both the type of brake fluid being used and its relative water and corrosion content. The test is performed much like a pH test in that a test strip is inserted into the hydraulic fluid and visually reviewed for the level of contamination. The test method uses samples taken from either the master cylinder or a brake cylinder. The above-described brake fluid test can be run quickly, typically taking less than 1 minute.

Figure 1:
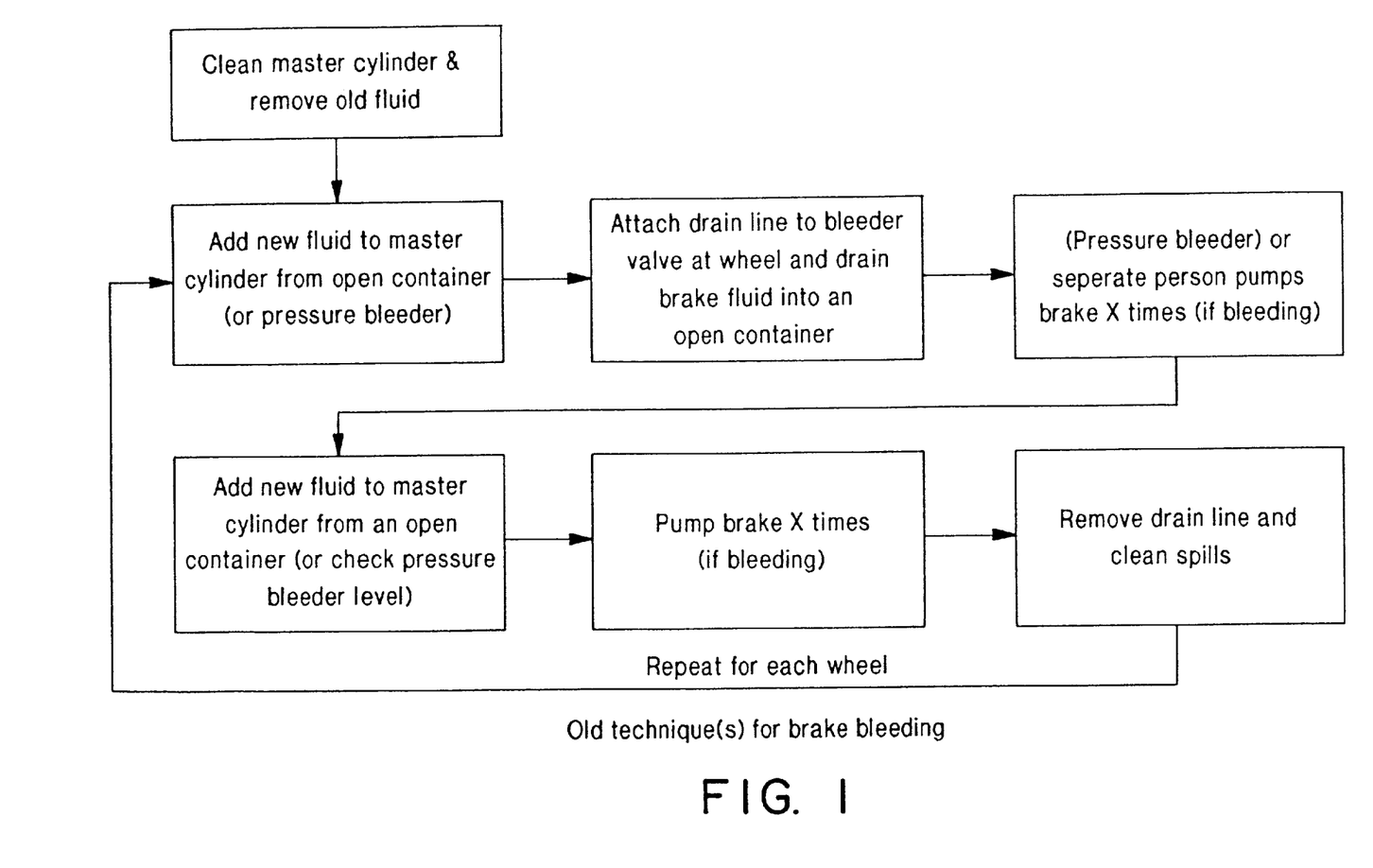
FIG. 1. is a flowchart of a prior art method for removing and replacing automotive brake fluid.

The prior art method of replacing brake fluid takes two people about 30 to 45 minutes to remove and replace the brake fluid. The prior art method also requires additional time to clean-up the resulting spillage that is essentially inherent in the prior art method. One commonly known method for removing and replacing a vehicle's hydraulic brake fluid and then removing air introduced into the brake lines by this two person, open system method is shown in FIG. 1.

Typically, about twice the volume of fluid the brake caliper can hold per wheel is used by the prior art method. Unfortunately, new brake fluid can become contaminated with moisture, air and particulates as soon as the brake fluid container is opened and poured into the brake system due to the typical open system method used to flush and replace used brake fluid.

What is needed therefore is an apparatus and method for safely removing fluid contaminants such as air, water and particulates and replacing hydraulic fluid from a vehicle or other equipment's hydraulic system without exposing the environment or the operator (harmful to humans) to hydraulic (brake) fluid. And for protectively store new brake fluid to prevent its contamination prior to use; and to provide proper containment for the waste hydraulic (brake) fluid being removed from the hydraulic system so it can be properly disposed.

SUMMARY OF THE INVENTION

The apparatus and method for removing and replacing hydraulic fluid without exposing the environment or the operator to the hydraulic fluid of the present invention solves the problem identified above. That is to say, the present invention provides superior apparatus and method for flushing fluid from a hydraulic system to remove contaminants such as air, water, particulates and deteriorated hydraulic fluid, and for filling the system with new brake fluid while minimizing problems with removal and disposal of the used brake fluid.

The present invention is based upon the concept that brake fluid can be removed and replaced and the brake system flushed of contaminants while maintaining a closed system. Additionally, exposure of an operator to the brake fluid or its fumes presents health hazards. Therefore, the apparatus of the present invention operates as a closed system, both in the fluid handling and the venting of the containers in the apparatus.

An apparatus within the scope of the present invention comprises a vacuum system, a pressure system, a fluid (old and new fluid) containment system, a computer and operator interface system, a spill warning system and a vehicle interface system. The function of the computer is to control the various operations necessary to perform an effective brake fluid change/flush and refill of the hydraulic system. It also provides information necessary to protect the operator and inform him of the status of the equipment and the changing process.

The vacuum system within the scope of the present invention includes a controllable vacuum wand to evacuate the master cylinder or cleanup spills. The pump in this system can also be reversed to allow the waste brake fluid collected in the apparatus to be easily transferred, using the controllable vacuum wand, to a larger portable container for proper disposal. This is done without the handling of the waste container by the equipment operator. This minimizes the potential for spills and operator exposure to the brake fluid.

The vacuum system within the scope of the invention also provides vacuum to the bleeder valves through the apparatus' four bleeder hoses to assist in the removal of the waste brake fluid from the hydraulic system. Vacuuming is accomplished through all four bleeder hoses at the same time to allow for a more rapid and efficient removal of the waste fluid from the hydraulic system. The vacuum wand is also available at the same time to provide a fifth vacuum of waste brake fluid from the ABS valve.

A specific objective of the apparatus is to match and surge the fluid flow created by the vacuum and pressure forces of the apparatus to allow for a more safe and effective removal of the spent brake fluid along with contaminants, and flush and refill of the hydraulic system. This combination of surging pressure at the master cylinder and surging vacuum at the bleeder valves provides an optimum fluid flow without unnecessary pressure or vacuum if used independently. This matching also insures that the vacuum system in the apparatus will not dry out the master cylinder.

The pressure (fresh fluid) system of the invention has the objective of moving fresh fluid into the system at pressures between 8 and 14 psi in a manner that will aid in the removal of contaminants. This is accomplished by the use of a pressure switch that has an operational range between nominal safe pressures. This creates a gentle surging of the new fluid entering the hydraulic system. This surging facilitates a more effective removal of particulates from the recesses of the hydraulic system with less new fluid required. The additional objective met is to reduce unnecessary waste generation.

Another objective of the present invention's pressure system is to move fluid through the hydraulic system safely and dependably. The pressure system consequently includes a flow sensor, which is monitored by the computer. It will stop the process if it detects that brake fluid is not flowing into the master cylinder during the service. This prevents the master cylinder from going dry and the possibility of allowing air to enter the hydraulic system. It also accomplishes the objective of completely using all the brake fluid in the new fluid container before changing to a new full container is necessary.

Another objective of the present invention's pressure system is to remove any pressure from the hydraulic system after the refill of the hydraulic system has been completed. This is accomplished using a reversible pump. The pump used in the pressure system is automatically reversed by the computer for several seconds after the service to eliminate any pressure to the master cylinder of the hydraulic system. This also accomplishes the objective of filling the master cylinder to the proper level before the master cylinder's cap is replaced.

It is another primary objective of the present invention to vent the new brake fluid container and waste brake fluid container in a manner to reduce operator exposure to brake fluid fumes and eliminate the exposure of the new brake fluid to moisture in the air. This is accomplished by cross venting the new and waste fluid containers through a desiccant medium.

The above and other objectives of the present invention will be explained in greater detail by reference to the attached figures and the description of the preferred embodiment, which follows. As set forth herein, the present invention resides in the novel features of form, construction, mode of operation and combination of parts presently describe and understood by the claims.

BRIEF DESCRIPTION OF THE DRAWINGS

In the drawings which illustrate the best modes presently contemplated for carrying out the present invention.

DETAILED DESCRIPTION

Figure 2:
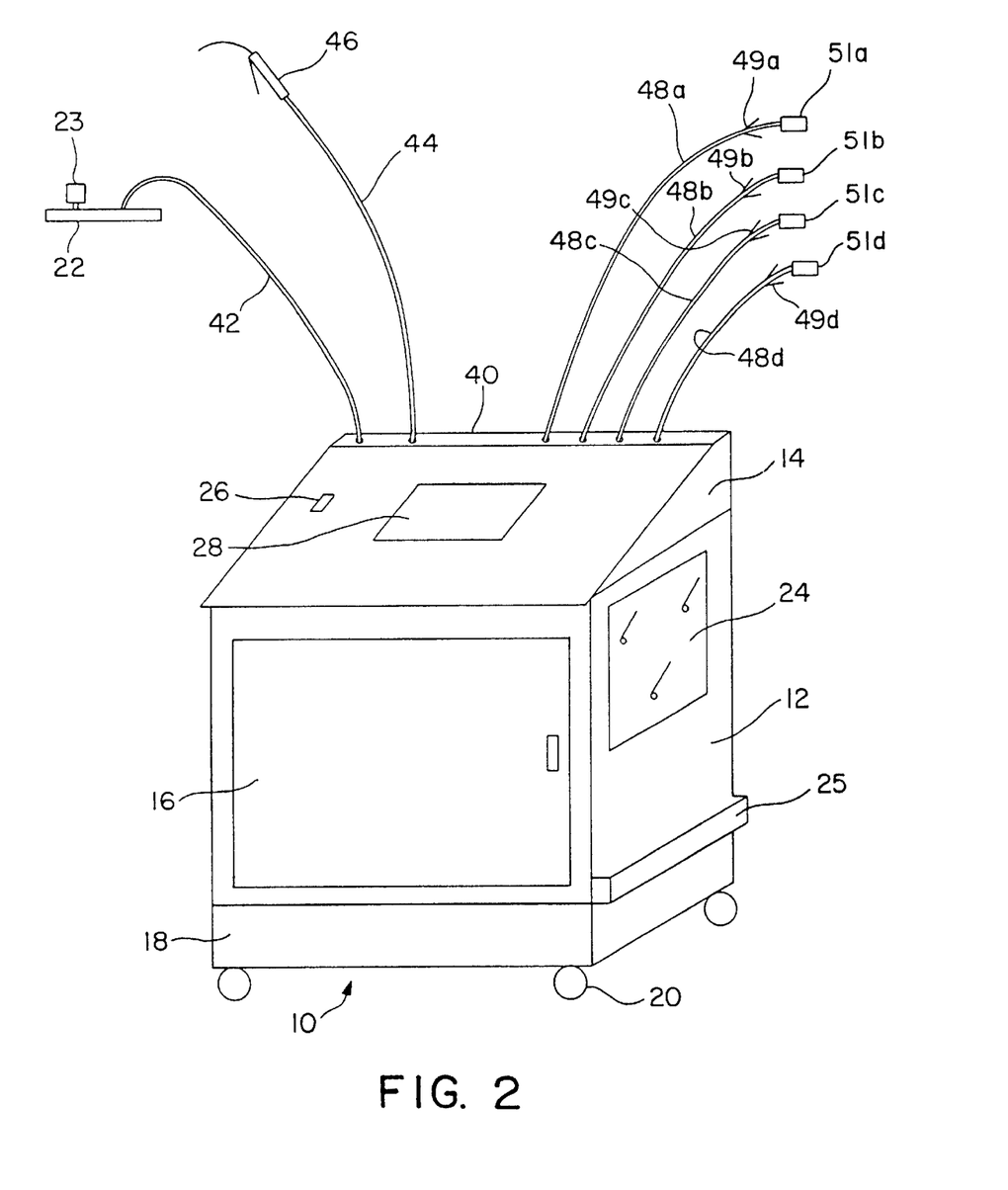
FIG. 2. is a perspective view of an embodiment of the present invention.

With reference to FIGS. 2 through 11, where like elements have been given like numerical designations to facilitate understanding of the present invention, the vehicle brake fluid removal and replacement apparatus of the present invention is designated generally 10. Illustrated in FIG. 2 is a perspective view embodiment of the present invention showing the brake flushing system 10 comprising a roll away cabinet 12, which includes an open able cabinet top 14, a door 16, a leak containment tank 18, and locking swivel casters 20 for easy positioning and locking in place. The apparatus comprising the invention 10 is all contained within the cabinet 12 except for the master cylinder adapters 22, which are stored on an adapter rack 24, attached to the side of the cabinet 12. Adapters 22 stored on this adapter rack will drip any excess brake fluid into the drip tray 25 under the adapter rack 24 attached to cabinet 12. The adapters all include an air vent 23, which allows air to vent out of the master cylinder as the apparatus 10 fills the master cylinder. The invention 10 is all contained in cabinet 12 to facilitate easy positioning near the vehicle or system to be serviced by the invention.

Figure 3:
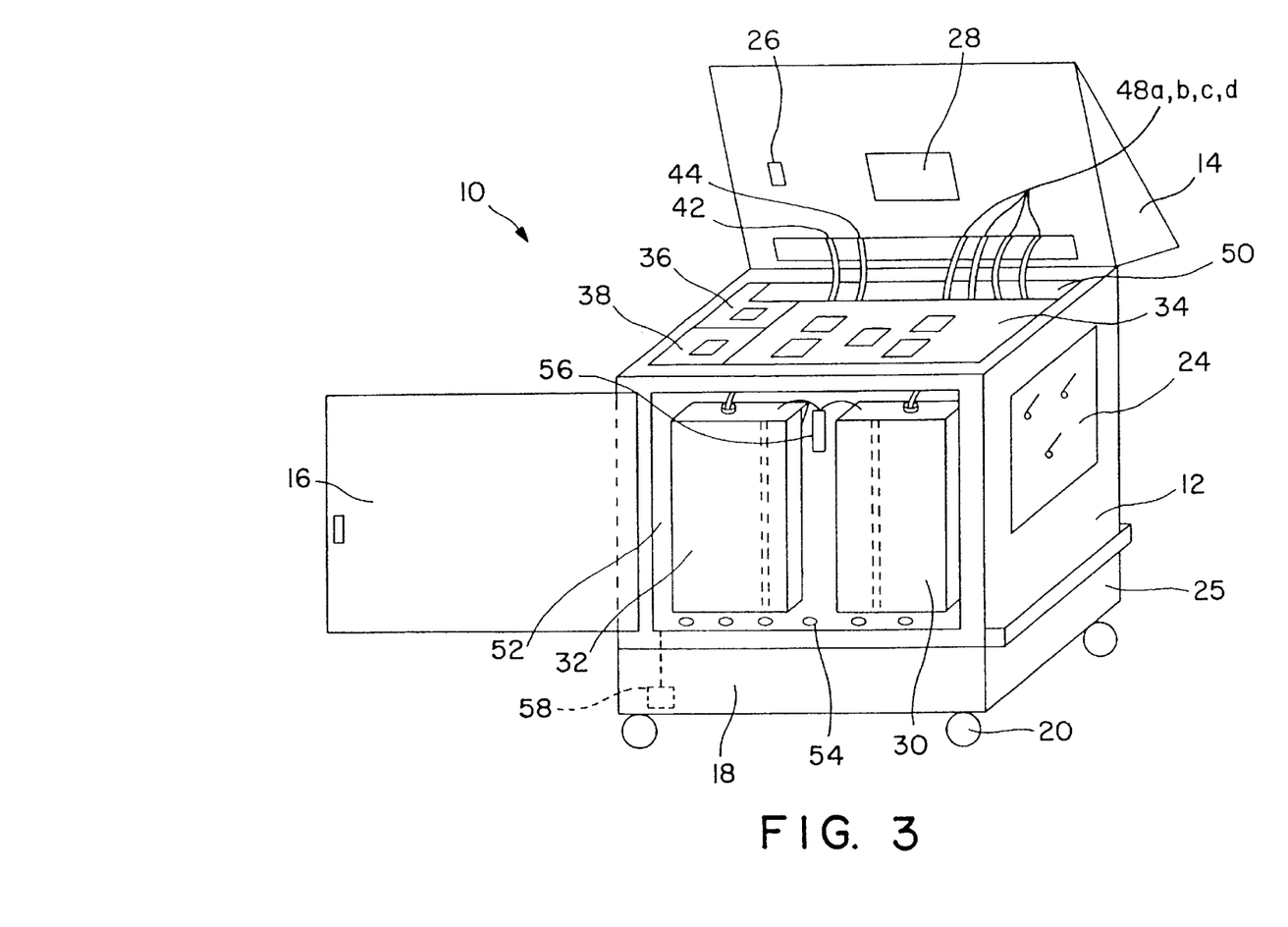
FIG. 3. is a front side view of the embodiments of the present invention shown in FIG. 2 with the doors and cabinet top open.

Cart 12 also includes the "on and off" switch 26 and computer interface 28, on cabinet top 14. In the preferred embodiment cart 12 includes the lower cabinet area 52, where the fresh fluid tank 30 (5 gal) and waste fluid tank 32 (6 gal) are located. Access to the fluid in these tanks is provided through special cap 74 for the waste fluid container 32, and special cap 82 for the new fluid container 30. Cart 12 also includes the hose containment section 50, and the leak containment section 18.

Figures 6, 6A:
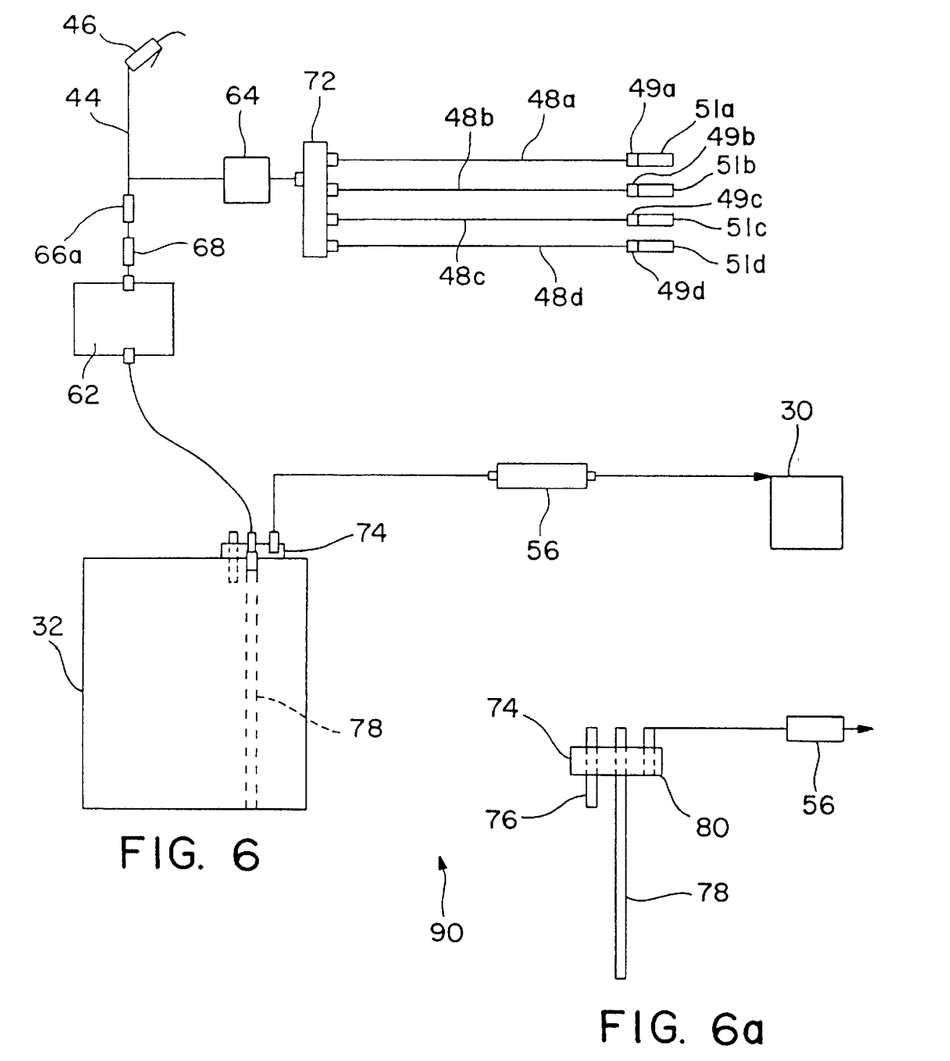
FIG. 6. is a schematic flowchart of the vacuum system used in the present invention shown in FIG. 5.
FIG. 6a. is a diagram of the waste fluid container cap shown in FIG. 6.
Figures 7, 7A:
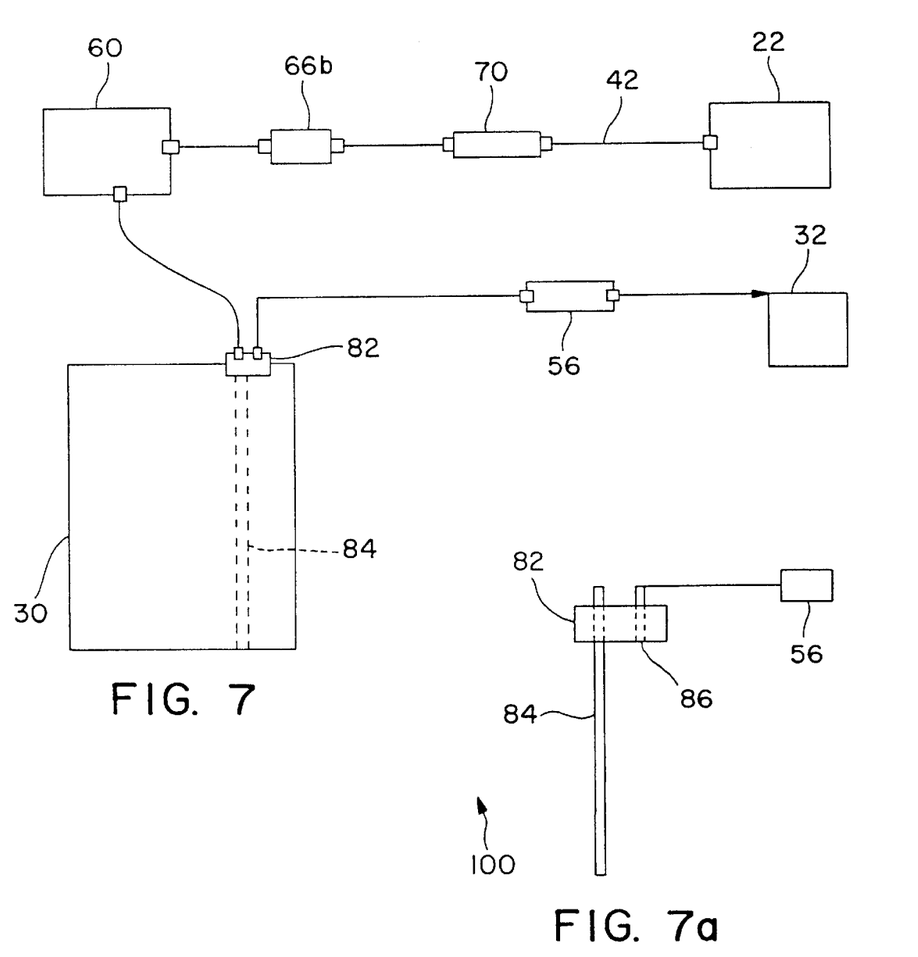
FIG. 7. is a schematic/flowchart of the pressure/fill system used in the present invention shown in FIG. 5.
FIG. 7a. is a diagram of the new fluid container cap shown in FIG. 7.

The waste fluid container 32 special cap 74 includes a fluid level sensor 76, a fluid access tube 78 and a vent access 80 that connects to the desiccant cross vent 56. The new fluid container 30 special cap 82 includes a fluid access tube 84 and a vent access 86 that also connects to the desiccant cross vent 56.

Figure 5:
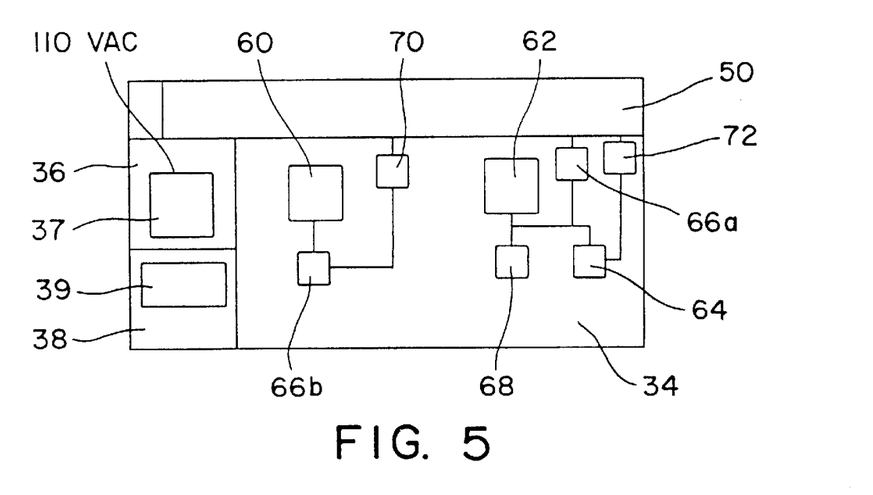
FIG. 5. is an overall schematic of the equipment area 34 as shown in FIG. 3.

For ease of installation and for easy repair access purposes, cart 12 under the raisable cabinet top 14, also includes an equipment section 34 (location for operational parts of the apparatus), where the reversible pressure pump 60, the reversible vacuum pump 62, the vacuum solenoid 64, the two pressure transducer/switches 66a and 66b, the vacuum transducer/switch 68, the flow sensor 70 and the manifold 72 are located. All these components are controlled by the computer 39 through the user interface 28.

Also under the raisable cabinet top 14 is the protected power supply area 36 where the 110 vac to 24 vdc converter 37 is located. This supplies low amperage dc power to the components of the apparatus 10. Also under the raisable cabinet top is the computer area 38 where the computer 39, which controls the function of the invention, is located.

Also part of cart 12 is hose tray 40 from which the master cylinder fill hose 42, the vacuum hose 44, the vacuum wand 46 and the four bleeder valve hoses 48a, 48b, 48c and 48d extend. Each of the bleeder hoses 48a, 48b, 48c, and 48d have a one way check valve 49a, 49b, 49c and 49d, which prevent backflow when bleeder valve adapters 51a, 51b, 51c and 51d are not attached to the hydraulic system's bleeder valves. When not in use, all hoses can be stored under the hose tray 40 in the hose containment area 50, which is located in the rear of the cabinet behind the container area 52 of the cabinet 12.

Figure 4:
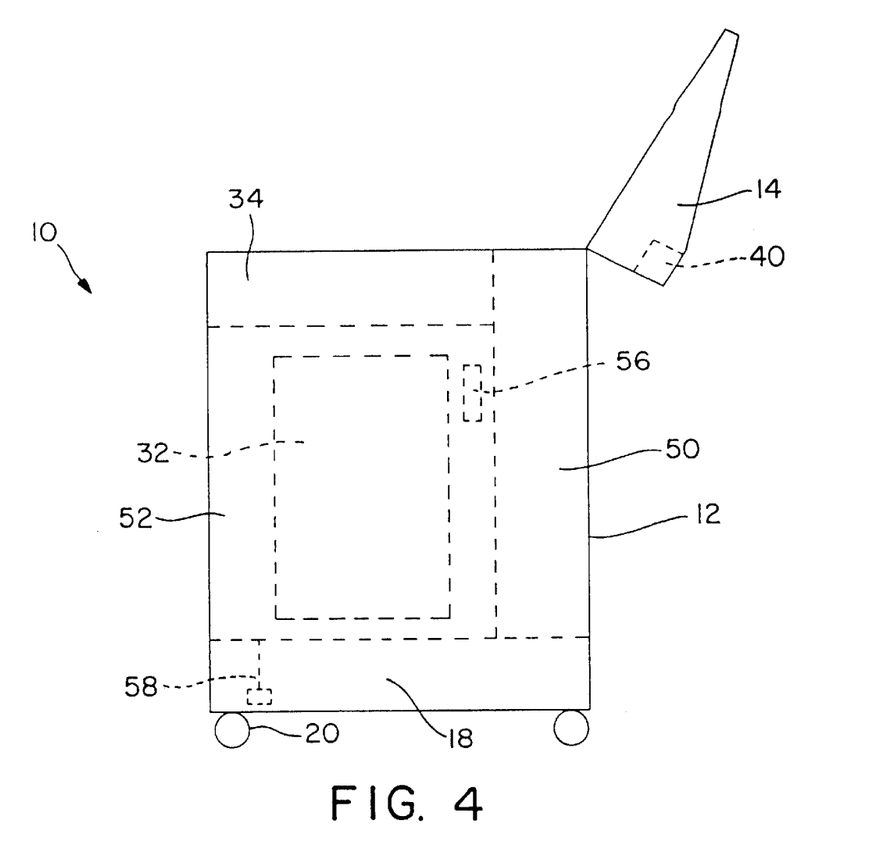
FIG. 4. is a side view of the embodiments of the present invention shown in FIG. 2 showing interior compartments.

Also located in the lower cabinet 52 is the desiccant cross-venting system 56, which cross vents, the new fluid container 30 with the waste fluid container 32. The lower cabinet also contains drain holes 54 to insure any fluid in the cabinet 12 is drained to the containment area 18. The containment section 18 also contains the liquid sensor 58, which warns the operator, through the operator interface 28, of any fluid in the containment area 18.

As shown in the schematic drawings of FIGS. 6 and 7 the apparatus 10 has two major component functions that are involved with performing a brake fluid flush and refill of the vehicle's or other equipment's hydraulic brake system. The vacuum/waste system 90 and the pressure/fill system 100.

The vacuum/waste system 90 vacuums old fluid from the master cylinder, the four wheel bleeder valves and the ABS valves, and transfers it to the waste fluid tank 32. It also is used to drain the waste fluid tank 32 when vacuum pump 62 is reversed. The primary components of the vacuum/waste system 90 includes a reversible vacuum pump 62, a vacuum transducer/switch 68, a solenoid valve 64, a pressure transducer switch 66*a*, a manifold 72, the vacuum hose 44, vacuum wand 46, the bleeder valve hoses 48 and the waste fluid tank 32.

The pressure/fill system 100 transfers new brake fluid from the new fluid tank 30 to the master cylinder through the master cylinder fill hose 42 and the master cylinder adapter 22 to fill it, and also to provide a low pressure flow of new fluid through the vehicles brake system to flush contaminants from the hydraulic brake system. The primary components of the pressure/fill system 100 includes a new fluid container 30, a reversible pressure pump 60, a pressure transducer/switch 66*b*, a flow switch 70, master cylinder fill hose 42 and master cylinder adapter22.

Figure 8:
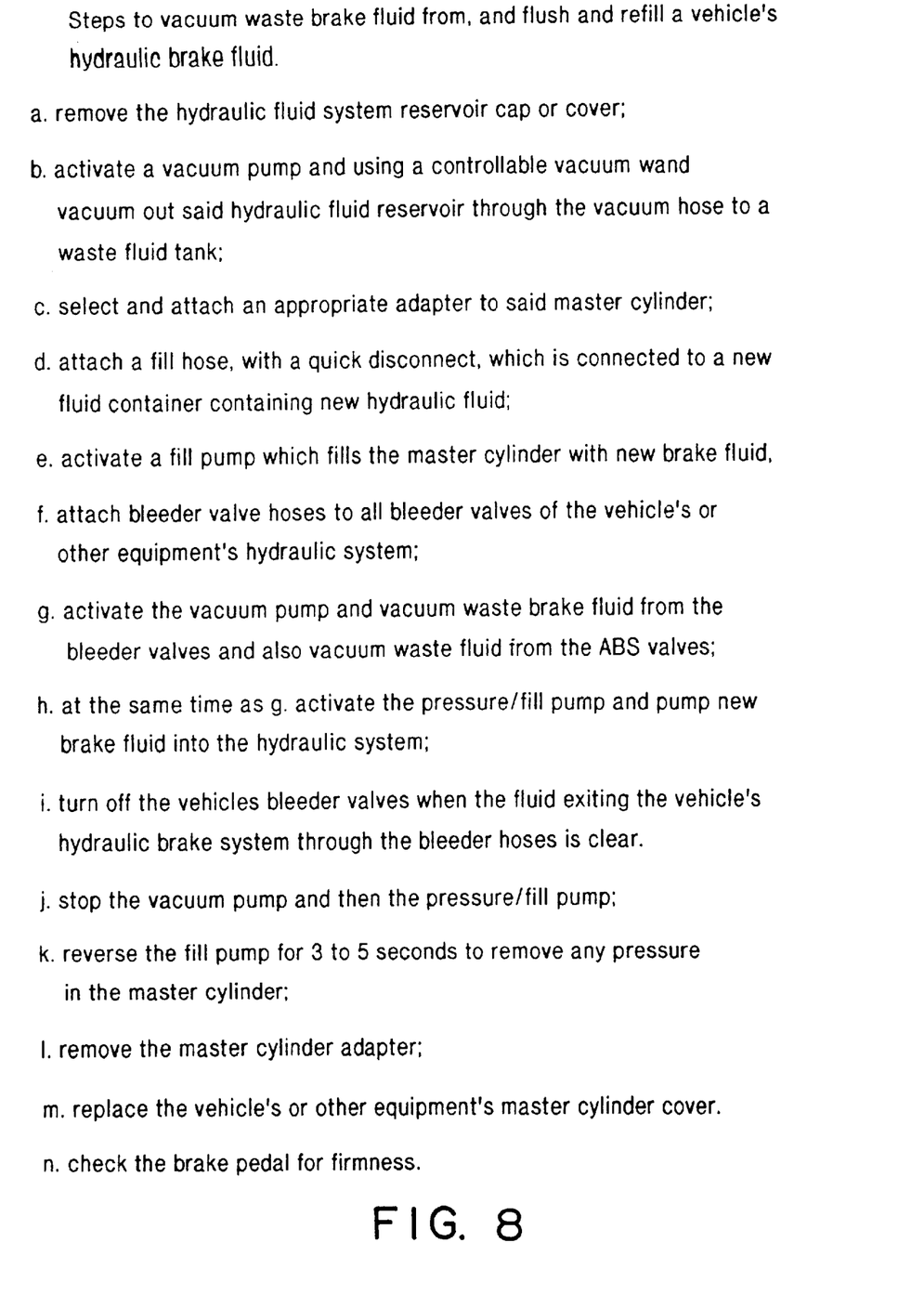
FIG. 8. is a flow chart of the operation of the apparatus.

A schematic of the operation of the apparatus 10 performing a hydraulic brake fluid system flush and refill is illustrated in FIG. 8 and described as follows. The master cylinder cover is removed and the brake fluid in the master cylinder can be tested for moisture or fluid breakdown, if desired, using available testing techniques. The vacuum/waste system 100 is initiated by turning the vacuum pump 62 on through the user interface 28, and the master cylinder is vacuumed clean using the vacuum wand 46. The vacuum force is controlled by the trigger grip on the vacuum wand 46. Once vacuumed clean the master cylinder is covered by the appropriate master cylinder adapter 22. The master cylinder adapter 22 is held firmly on the master cylinder by rubber or cable restraints.

The pressure/fill system 100 is initiated by turning the pressure pump 60 on using the operator interface 28. The reversible pressure pump 60 transfers new brake fluid from the new fluid tank 30 to the master cylinder adapter 22 and into the master cylinder of the vehicle. As the master cylinder is filling the air vent 23 allows any air in the lines and the master cylinder to be vented out of the master cylinder. This is to insure that air is, not pressurized against the new brake fluid (possibly contaminating it with moisture) or, not introduced into the vehicles brake system. This flow of new brake fluid into the master cylinder is monitored and controlled by the pressure transducer switch 66*b* and the flow switch 70.

Figure 9:
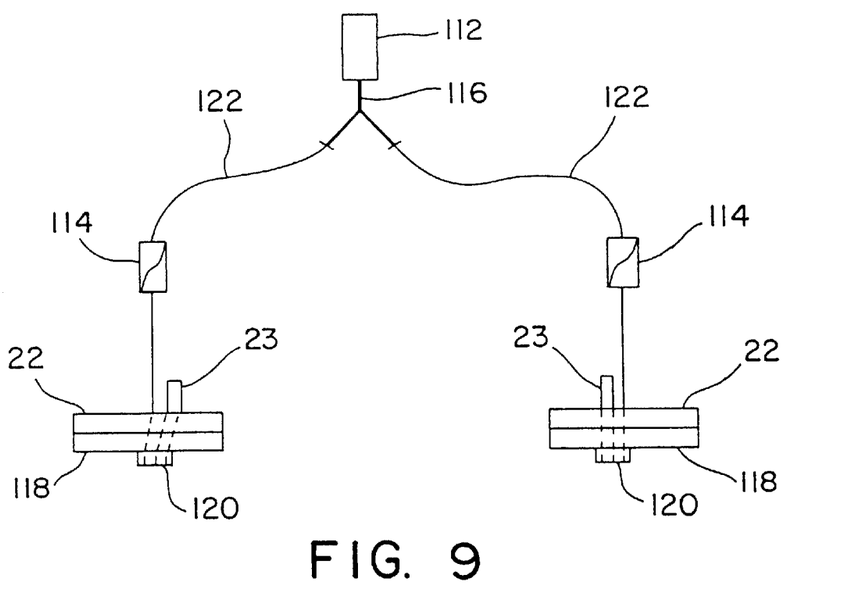
FIG. 9 is a diagram of an adapter system of an embodiment of the present invention.
Figure 10:
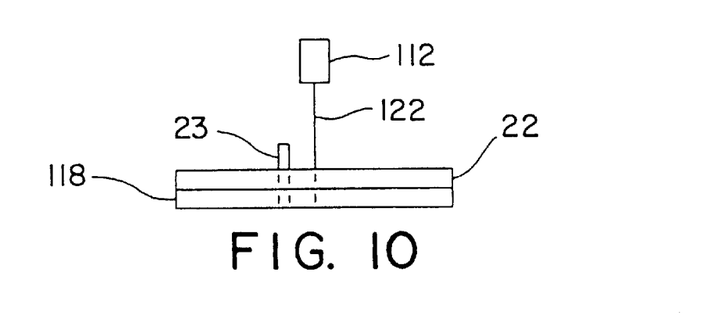
FIG. 10 is a front view of an adapter of an embodiment of the present invention.
Figure 11:
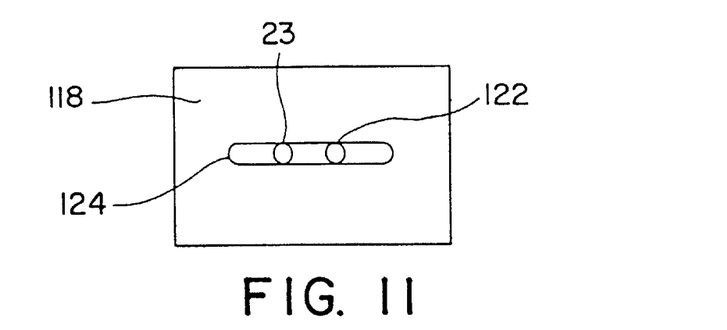
FIG. 11 is a bottom view of an adapter of an embodiment of the present invention.

Illustrated in FIGS. 9 through 11 are view embodiments of the present invention showing the adapter system used by the apparatus 10 to connect to a vehicle's hydraulic brake system master cylinder opening or to other equipment's hydraulic fluid reservoir opening. Adapter I (shown in FIG. 9) is used for two section master cylinders (two access caps) or for master cylinders with one small access cap. Adapter II (shown in FIGS. 10 and 11) is used for master cylinders with a large access opening.

Adapter I is comprised of a quick disconnect 112 for ease of attachment to the master cylinder fill hose 42. Y-fitting 116 allows new brake fluid to flow through the polyurethane tubing 122 to the adapter plates 22. If it is desired to only use one of the adapter plates 22 then the flow control fitting 114 can be engaged which stops the flow of hydraulic fluid to that sides adapter plate 22. All adapter plates have permanently attached a soft closed cell rubber, neoprene or other brake fluid resistant material that acts as the seal 118. The softness allows for easy fitting to different shaped hydraulic fluid reservoir openings. The softness also fills space in the master cylinder reservoir during the flush and fill service. Once the service is complete and the master cylinder adapter removed the result is a properly filled master cylinder (the master cylinder is never filled to the top).

The adapter I adapter plates 22 also have an additional fitting protrusion 120 attached to the seal 18. This protrusion 120 helps correctly position the adapter plate22 over the small opening of some adapters. This protrusion 120 also contains the vent 23 and openings for the new fluid to enter the master cylinder. The adapter II adapter plates 22 do not use this protrusion 120.

The adapter II adapter plate 22 also has a vent 23, a fluid input line 122 and a quick disconnect 112. It is different from adapter I adapter plate 22 in that it doesn't have a fitting protrusion 120 but does have a fluid groove 124 cut out of the seal 118. This is to allow fluid flow in a segmented master cylinder without the necessity of having two fluid input lines to fill the segmented portions of the master cylinder.

The initial objective of the master cylinder fill function is to fill the master cylinder to the full level of the master cylinder and then stop putting unnecessary fluid under pressure into the master cylinder (since the vehicle's bleeder valves are not opened at this time continued pressure on the master the cylinder is counter productive). Consequently the pressure transducer switch is set at a nominal pressure of 7 to 8 psi after which the pressure pump is stopped. This occurs when all the air has vented through the vent 23 on the master cylinder adapter 22 and the master cylinder is consequently full with new brake fluid. This air vent 23 function is to be open until the fluid level causes the float in the vent 23 to rise and close a valve to keep fluid from escaping. Once the vent 23 is closed the pressure produced by the pressure pump 60 will rise to 7 to 8 psi causing the pressure transducer/switch 66*b* to activate, turning off the pressure pump 60.

Two additional objectives of the pressure/fill system 100 is to insure that there is adequate fluid to keep the master cylinder full during the service, and to insure that all fluid in the new fluid tank 30 is completely emptied (prior to replacement) to minimize any unnecessary waste of new brake fluid left in the new fluid container 30. This is accomplished by fluid sensor 70 located after the pressure pump 60 and after the pressure transducer/switch 66*b*. This fluid sensor 70 detects the flow of liquid in the master cylinder fill tube 42. Once the absence of fluid is detected by the fluid sensor 70 the computer shuts off the pressure pump 60 preventing the introduction of air into the master cylinder. This positioning of the fluid sensor 70 after the pressure pump 60 and after the pressure transducer/switch 66*b* insures that the maximum amount of new brake fluid available has been transferred from the new fluid container 30. The operator interface 28 then advises the operator that the apparatus 10 requires the removal of the empty new fluid container 30 and the insertion of a full container of new brake fluid.

After the initial fill of the master cylinder as described in the preceding paragraph the brake system flush and refill is continued by direction of the service provider using the operator interface 28. After the bleeder valve connectors 51 have been attached to the hydraulic system's bleeder valves and the vehicle's bleeder valves opened the apparatus is ready to flush and fill the brake system. Of note is the use of one way check valves 49 on each bleeder hose 48 to prevent any leakage from the bleeder hoses between services, and also to prevent fluid flow from the apparatus 10 back into the vehicle's brake system.

The service provider now initiates the flush and fill process by using the operator interface 28 and computer 39. The computer turns on the pressure pump 60 and allows the pressure to rise to 6 to 10 psi (monitored by the pressure transducer/switch 66b) before turning on the vacuum/scavenge system 90. The computer then turns on the vacuum pump 62 and opens solenoid valve 64 to allow vacuum to the manifold 72 and the bleeder hoses 48. During this time there is vacuum force also available at the vacuum wand 46 in case of the need to vacuum a spill or to be used to directly vacuum the ABS valves.

The objective of the pressure/fill system 100 and the vacuum/scavenge system 90 during the flush/fill cycle is to produce a surging flow of new brake fluid through the vehicle's brake system. This surging flow provides the most effective and safe method for moving particulates and contaminants out of the hydraulic brake system. Another objective is to create a strong flow (approximately 0.1 to 0.25 gallons per minute) without over pressurizing or over vacuuming the vehicle's hydraulic brake system. This is accomplished by the combination of a pressurized (nominal) flow into the master cylinder and a vacuum (nominal) flow out of the vehicle's bleeder valves.

The pressurized (nominal) flow into the master cylinder is controlled by the pressure/fill system 100 through its pressure transducer/switch 66b, which is set to activate at a pressure of 10 psi or other nominal pressure. Once a pressure of 10 psi is established in the master cylinder fill hose 42 the pressure transducer/switch 66b advises the computer 39 which turns off the pressure pump 60. The pressure transducer/switch has been specifically chosen for its "dead zone" of from 2 to 4 psi, which requires the pressure in the master cylinder fill tube 42 to drop 2 to 4 psi before the pressure transducer/switch 66b reactivates to turn the pressure pump 60 back on. At the same time the vacuum/scavenge system 90 is providing similar control of its vacuum pump 62 through the actions of the vacuum switch 68 which is monitoring and providing vacuum at the bleeder valves of approximately 5 to 10" Hg or other nominal vacuum force.

This combination of surging pressurized (nominal) flow and surging vacuum (nominal) induced flow results in a safe and effective surging flow of new brake fluid into the vehicle's hydraulic brake system.

Once the technician sees clear brake fluid evident in the bleeder hoses 48 he turns off the bleeder valves and then the apparatus 10 using the operator interface 28. The computer first turns off the vacuum/scavenge system 90 then reverses the pressure pump 60 for 3 to 5 seconds before turning off the pressure/fill system 100. The objective of reversing the pressure pump 60 prior to shutting off the pressure/fill system 100 is to remove any residual pressure in the master cylinder to allow for the safe removal of the master cylinder adapter 22.

Another objective of the apparatus 10 is to allow removal of the waste brake fluid in the waste fluid container 32 with as little handling as possible. Once the fluid level sensor 76 located in the waste fluid container 30 cap 74 senses the fluid level is full it signals the computer which stops the apparatus 10 and requires the emptying of the waste fluid container 32 prior to allowing any other function. This is accomplished by placing the vacuum wand 46 into an approved waste collection container such as the 30-gallon waste container provided by Safety-Kleen for this purpose. The service provider can then turn on the reversing vacuum pump 62 using the operator interface 28. The vacuum wand 46 can now be opened to allow transfer of the waste brake fluid in the waste fluid tank 32 to be removed to a larger approved transportable container for transport to an approved disposal facility.

The objective of the containment area 18 is to provide a 10-gallon capacity containment area in case of a container leak, hose break or other leak condition. Any fluid leaking in the cabinet 12 is directed through drain holes 54 and cabinet 12 design to flow to the containment area 18. The containment area 18 has a liquid sensor 58, which is monitored by the computer 39 which will shut off flush and fill functions until the source of the fluid is determined and corrected. The vacuum wand 46 can be used to clean out the containment area 18.

Both the new fluid container 30 and the waste fluid container 32 require venting to allow equalization of pressure as they are emptied and filled during flush and fill services. Venting of the new fluid container 30 requires that air entering this container be filtered and free of moisture to the extent possible to prevent moisture and other particulate contamination of the new fluid before it is put in the vehicle's brake system. Air escaping the waste fluid container 32, as it is being filled with waste fluid, contains brake fumes. These brake fumes are considered toxic air pollutants and harmful to human health by various Air Quality Management Districts. The objective is to provide a means to provide dry filtered air venting for the new fluid container 30 and minimize fumes from the waste fluid container 32. This was accomplished by cross venting the new fluid container 30 with the waste fluid container 32 using a pressure releasing vent 56 with a moisture and fume eliminating desiccant material. As the waste tank 32 is being filled by waste fluid during operation of the apparatus 10 the displaced air is vented out of the waste fluid container cap 74 through the cross vent 56 where the fumes and moisture are removed and the air filtered prior to entering the new fluid container 30 through its cap 82. Any pressure created between the new fluid container waste fluid container 32 is automatically released by the desiccant cross vent 56. Any pressure release will be of fume free air.

What is claimed:

1. An apparatus for removing and replacing hydraulic fluid used in a hydraulic system, comprising:
   a cabinet;
   a leak containment tank under the cabinet to contain leaks from within the apparatus;
   a computer control unit;
   a new fluid container in said cabinet for providing a source of new fluid for use in flushing and filling the hydraulic system;
   a waste fluid container in said cabinet for receiving waste fluid from the hydraulic system;
   a reversible fill pump in fluid communication with the new fluid container and controlled by the computer control unit for dispensing new fluid from the new fluid container to the hydraulic system through a fill hose to be connected to the hydraulic system;
   a reversible vacuum pump in fluid communication with the waste fluid container and controlled by the computer control unit for vacuuming waste fluid from the hydraulic system to said waste fluid container through one or more bleeder valve hoses to be connected to the hydraulic system and said waste fluid container;

a connection means at an end of each of said one or more bleeder valve hoses;

a connection means at the end of said fill hose; and, a vacuum wand connected with a first end of a vacuum hose, the reversible vacuum pump in fluid communication with the other end of the vacuum hose for vacuuming fluid through the vacuum wand.

2. The apparatus according to claim 1, further comprising a universal master cylinder adapter for removeably connecting said fill hose to an opening of the hydraulic system, wherein the universal master cylinder adapter includes a seal for sealing the opening.

3. The apparatus according to claim 2 wherein said universal master cylinder adapter fills a portion of the opening when the seal seals the opening.

4. The apparatus and method according to claim 2 wherein said universal master cylinder adapter includes a round protrusion to allow fitting the universal master cylinder adapter to the opening.

5. The apparatus according to claim 1, further comprising a universal master cylinder adapter for removeably connecting said fill hose to a two section opening of the hydraulic system, wherein said universal master cylinder adapter allows stopping the flow of new fluid from the fill hose to one of the two sections of the opening.

6. The apparatus according to claim 1 wherein said one or more bleeder valve hoses each include a check valve to prevent flow out of each of the one or more bleeder hoses.

7. The apparatus according to claim 1 wherein a trigger grip of the vacuum wand controls the vacuum at the vacuum wand.

8. The apparatus according to claim 1 wherein a vacuum solenoid valve isolates said reversible vacuum pump from the one or more bleeder hoses when the vacuum solenoid valve is closed, the computer control unit being configured to control the vacuum solenoid valve.

9. The apparatus according to claim 1 further comprising a liquid sensor connected with the fill hose for the computer control unit to sense the presence of liquid in the fill hose.

10. The apparatus according to claim 9 further comprising, a pressure transducer in fluid communication with the fill hose for the computer control unit to sense the pressure in the fill hose.

11. The apparatus and method according to claim 9 wherein said computer control unit is configured to control the reversible fill pump to create a controlled surging flow of new brake fluid into the hydraulic system.

12. The apparatus and method according to claim 9 wherein said computer control unit is configure to reverse the reversible fill pump to eliminate pressure in the fill hose.

13. The apparatus according to claim 1, further comprising a liquid sensor in the containment tank for the computer control unit to sense liquid in the containment tank.

14. The apparatus according to claim 13 wherein said computer control unit is configured to advise the service provider of a leak when the liquid sensor senses liquid in the containment tank.

15. The apparatus according to claim 1, further comprising a cross vent containing a hydraulic fluid fume removing desiccant that allows the new fluid container and waste fluid container to communicate through the desiccant.

16. The apparatus according to claim 15 wherein said cross vent allows air to vent from the waste fluid container.

17. A method of using an apparatus for removing hydraulic fluid from a hydraulic brake system, comprising the steps of:
   a. removing a cap from an opening of a master cylinder of the hydraulic system;
   b. activating a vacuum pump and using a controllable vacuum wand to vacuum out said reservoir to a waste fluid container;
   c. selecting and attaching a master cylinder adapter to the opening;
   d. activating a fill pump to fill the master cylinder with new fluid until a preselected pressure is achieved in the master cylinder;
   e. attaching a bleeder valve hose to a bleeder valve of the hydraulic system;
   f. activating a solenoid valve which opens a vacuum line to the bleeder hoses;
   activating a vacuum pump to vacuum waste brake fluid from the bleeder valves via the bleeder valve hoses and vacuum line and to supply vacuum to the vacuum wand;
   h. at the same time as i. activating the fill pump to supply pressure at the master cylinder to cause waste fluid to flow out of the hydraulic system and new brake fluid to flow into the hydraulic system;
   i. closing the bleeder valves when the fluid flowing out of the hydraulic system through the bleeder hose is clear;
   j. stopping the vacuum pump and then the fill pump;
   k. reversing the fill pump for 3 to 5 seconds to remove pressure in the master cylinder,
   l. removing the master cylinder adapter from the opening;
   m. replacing the master cylinder cap;
   n. checking a pedal of the hydraulic system for firmness.

18. The method according to claim 17 wherein said vacuum pump is reversed to flow waste fluid from a waste fluid container through the vacuum wand.

19. The method according to claim 17 wherein said vacuum wand is used to vacuum fluid in a containment area.

20. An apparatus for servicing a hydraulic system, the hydraulic system including a master cylinder having an opening and a cap over the opening, the hydraulic system also having one or more bleeder valves in fluid communication with the reservoir, comprising:
   a new fluid tank;
   a fill pump in fluid communication with the new fluid tank;
   a master cylinder adapter in fluid communication with the fill pump and having a seal to seal the opening of the master cylinder, the fill pump to supply fluid from the new fluid tank to the master cylinder;
   one or more bleeder valve hoses, each bleeder valve hose of the one or more bleeder valve hoses to be connected to a bleeder valve of the one or more bleeder valves; and,
   a waste fluid tank in fluid communication with the one or more bleeder valve hoses.

21. The apparatus of claim 20, further comprising:
   a vacuum pump in fluid communication with the one or more bleeder valves and the waste fluid tank to vacuum waste fluid from the one or more bleeder valves.

22. The apparatus of claim 21, wherein the vacuum pump is a reversible vacuum pump.

23. The apparatus of claim 21, further comprising a vacuum wand in fluid communication with the vacuum pump, the vacuum pump to vacuum fluid from the vacuum wand.

24. The apparatus of claim 23, wherein the vacuum wand includes a trigger grip to control the vacuum wand.

25. The apparatus of claim 21, wherein the waste fluid tank is in fluid communication with the ambient air through the desiccant.

26. The apparatus of claim 20 wherein the fill pump further comprises a reversible fill pump.

27. The apparatus of claim 20, further comprising:

a cross vent containing a desiccant, the new fluid tank and the waste fluid tank in fluid communication through the desiccant.

28. The apparatus of claim 20, wherein each of the one or more bleeder valve hoses is coupled to a check valve to prevent back flow from the each of the one or more bleeder valve hoses.

29. The apparatus of claim 20, wherein the seal fills a portion of the master cylinder when the master cylinder adapter is sealed to the master cylinder.

30. The apparatus of claim 20, wherein the seal has a fluid groove in fluid communication with the fill hose, the groove being positioned to allow flow into one or more segments of the master cylinder when the master cylinder adapter is sealed to the master cylinder.

31. The method of claim 20, further comprising:

a pressure transducer in fluid communication with the fill hose.

32. The method of claim 20, further comprising:

a liquid sensor connected to the fill hose.

33. A method of servicing a hydraulic system, the hydraulic system including a master cylinder having an opening and a cap over the opening, the hydraulic system also having one or more bleeder valves in fluid communication with the reservoir, comprising:

sealing a master cylinder adapter to the opening of the master cylinder;

opening a bleeder valve of the one or more bleeder valves;

flowing fluid from the master cylinder adapter to the master cylinder;

pressurizing the master cylinder with fluid from the master cylinder adapter; and, closing the bleeder valve.

34. The method of claim 33, wherein the flowing fluid further comprises flowing fluid to a plurality of sections of the master cylinder.

35. The method of claim 33, further comprising:

causing the flow of fluid from the master cylinder adapter to the master cylinder to surge.

36. The method of claim 33, further comprising:

filling a volume of the master cylinder with the master cylinder adapter.

37. The method of claim 33, further comprising: placing a protrusion of the master cylinder adapter in the master cylinder.

38. The method of claim 33, further comprising:

depressurizing the master cylinder after the sealing the sealing a master cylinder adapter to the opening of the master cylinder.

39. The method of claim 33, further comprising:

vacuuming waste fluid from a bleeder valve of the one or more bleeder valves.

40. The method of claim 39, wherein the vacuuming further comprises vacuuming the waste fluid to a waste fluid tank.

41. The method of claim 40, further comprising venting the waste fluid tank through a desiccant.

42. The method of claim 33, further comprising:

determining that the master cylinder is full by sensing a pressure in fluid communication with the master cylinder adapter.

* * * * *